(12) United States Patent
Okada et al.

(10) Patent No.: US 12,286,108 B2
(45) Date of Patent: Apr. 29, 2025

(54) TRAVEL CONTROLLER, METHOD FOR TRAVEL CONTROL, AND NON-TRANSITORY COMPUTER-READABLE MEDIUM HAVING COMPUTER PROGRAM FOR TRAVEL CONTROL STORED THEREIN

(71) Applicant: TOYOTA JIDOSHA KABUSHIKI KAISHA, Toyota (JP)

(72) Inventors: Yu Okada, Ichikawa (JP); Shota Fujii, Tokyo (JP); Eiki Kitagawa, Tokyo (JP); Suzuka Kondo, Tokyo (JP); Soichi Yoshino, Ichikawa (JP); Takuo Kaneko, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 17/700,000

(22) Filed: Mar. 21, 2022

(65) Prior Publication Data

US 2022/0306097 A1    Sep. 29, 2022

(30) Foreign Application Priority Data

Mar. 25, 2021   (JP) .................................. 2021-052190

(51) Int. Cl.
  *B60W 30/10*   (2006.01)
  *B60W 30/18*   (2012.01)
(52) U.S. Cl.
  CPC ...... *B60W 30/10* (2013.01); *B60W 30/18163* (2013.01); *B60W 2552/53* (2020.02)
(58) Field of Classification Search
  CPC ...... B60W 10/04; B60W 10/20; B60W 30/10; B60W 30/143; B60W 30/165; B60W 30/18154; B60W 30/18159; B60W 30/18163; B60W 60/001; B60W 60/0011; B60W 60/0027; B60W 60/00272; B60W 60/00274; B60W 60/00276;

(Continued)

(56) References Cited

U.S. PATENT DOCUMENTS

2009/0271071 A1* 10/2009 Buerkel .............. B60T 8/17557
                                                                 701/1
2019/0009819 A1    1/2019 Ishioka et al.
(Continued)

FOREIGN PATENT DOCUMENTS

JP         2019-051837 A    4/2019
JP    WO2018/123019 A1    7/2019
(Continued)

*Primary Examiner* — Peter D Nolan
*Assistant Examiner* — Ce Li Li
(74) *Attorney, Agent, or Firm* — Oliff PLC

(57) ABSTRACT

A travel controller generates routes respectively leading from a current lane being traveled by a vehicle to lanes except the current lane. The lanes are demarcated by lane lines and located forward in a travel direction beyond a lack-of-lane zone having no lane line. The travel controller further identifies one of the routes corresponding to a path along which the vehicle is traveling the lack-of-lane zone as a route being traveled. The path is calculated with data outputted from a sensor mounted on the vehicle. Then the travel controller controls travel of the vehicle to keep one of the lanes to which the route being traveled leads.

7 Claims, 5 Drawing Sheets

(58) Field of Classification Search
CPC ......... B60W 60/0055; B60W 2400/00; B60W 2420/403; B60W 2420/408; B60W 2520/10; B60W 2520/14; B60W 2540/18; B60W 2552/05; B60W 2552/10; B60W 2552/15; B60W 2552/30; B60W 2552/50; B60W 2552/53; B60W 2554/00; B60W 2554/4041; B60W 2554/4045; B60W 2554/4049; B60W 2554/406; B60W 2554/802; B60W 2554/805; B60W 2556/50; B60W 2710/20; B60W 2710/207; B60W 2720/10; B60W 2720/12; B60W 2720/24; B62D 15/025; B62D 15/0255; G06V 20/588
See application file for complete search history.

(56) References Cited

U.S. PATENT DOCUMENTS

| | | | |
|---|---|---|---|
| 2019/0084619 A1 | 3/2019 | Mizoguchi | |
| 2019/0389463 A1* | 12/2019 | Mizutani | G05D 1/0291 |
| 2020/0082724 A1* | 3/2020 | Oguro | B60W 30/165 |
| 2020/0247413 A1 | 8/2020 | Fukuda et al. | |
| 2021/0331707 A1* | 10/2021 | Emoto | B60W 30/165 |
| 2022/0135039 A1* | 5/2022 | Jardine | B60W 30/18159 |
| | | | 701/26 |
| 2022/0137641 A1* | 5/2022 | Stenneth | G01C 21/3833 |
| | | | 701/23 |

FOREIGN PATENT DOCUMENTS

| | | |
|---|---|---|
| JP | 2020-126024 A | 8/2020 |
| WO | 2017/159489 A1 | 9/2017 |

\* cited by examiner

TRAVEL CONTROLLER, METHOD FOR TRAVEL CONTROL, AND NON-TRANSITORY COMPUTER-READABLE MEDIUM HAVING COMPUTER PROGRAM FOR TRAVEL CONTROL STORED THEREIN

FIELD

The present disclosure relates to a controller and a method for automatically controlling travel of a vehicle and to a non-transitory computer-readable medium having a computer program for such travel control stored therein.

BACKGROUND

A travel controller that automatically controls travel of a vehicle, based on images of its surroundings generated by a camera mounted on the vehicle, detects lane lines from the images and controls travel of the vehicle so that it will travel along a lane demarcated by the lane lines (lane keeping control). Additionally, the travel controller controls travel of the vehicle in a road including multiple lanes so that the vehicle will move from the lane being traveled to another lane (lane change control).

Japanese Unexamined Patent Publication No. 2020-126024 (hereafter "Patent Literature 1") describes a vehicle control system that automatically makes a lane change from a current lane to a diverging lane including multiple sublanes. A shift from a current lane to a diverging lane including multiple sublanes may involve a lane change to a sublane of the diverging lane and a subsequent lane change to another sublane of the diverging lane. The vehicle control system described in Patent Literature 1 generates a travel route for a lane change to the sublane of the diverging lane farthest from the current lane differently from a travel route for a lane change to another sublane of the diverging lane, thereby reducing the number of lane changes.

SUMMARY

When a lane change is made from a current lane to another lane at a location having no lane line, such as a location where the number of lanes increases, a travel controller cannot appropriately determine whether movement to the target lane has been finished, based on lane lines. For this reason, the travel controller may shift from the lane change control to the lane keeping control at a position corresponding to a lane different from the target lane, and execute control to travel along the nontarget lane.

It is an object of the present disclosure to provide a travel controller that can control travel of a vehicle to appropriately change travel lanes even at a location having no lane line.

A travel controller according to the present disclosure includes one or more processors configured to generate routes respectively leading from a current lane being traveled by a vehicle to lanes except the current lane. The lanes are demarcated by lane lines and located forward in a travel direction beyond a lack-of-lane zone having no lane line. The one or more processors of the travel controller is further configured to identify one of the routes corresponding to a path along which the vehicle is traveling the lack-of-lane zone as a route being traveled. The path is calculated with data outputted from a sensor mounted on the vehicle. The one or more processors of the travel controller is further configured to control travel of the vehicle to keep one of the lanes to which the route being traveled leads.

The one or more processors of the travel controller according to the present disclosure is preferably further configured to control travel of the vehicle so that the vehicle will move from the current lane to a target lane that is one of the lanes except the current lane.

The one or more processors of the travel controller according to the present disclosure at the identification preferably identifies one of the routes whose direction corresponds to a travel direction of the vehicle in the lack-of-lane zone as the route being traveled.

When only one of the routes is reachable by the vehicle from a current position in the lack-of-lane zone, the one or more processors of the travel controller according to the present disclosure at the identification preferably identifies the one of the routes as the route being traveled.

The one or more processors of the travel controller according to the present disclosure at the identification preferably identifies the route being traveled after the distance from the current lane to the current position of the vehicle in the lack-of-lane zone exceeds a distance threshold.

A method for travel control according to the present disclosure includes generating routes respectively leading from a current lane being traveled by a vehicle to lanes except the current lane. The lanes are demarcated by lane lines and located forward in a travel direction beyond a lack-of-lane zone having no lane line. The method further includes identifying one of the routes corresponding to a path along which the vehicle is traveling the lack-of-lane zone as a route being traveled. The path is calculated with data outputted from a sensor mounted on the vehicle. The method further includes controlling travel of the vehicle to keep one of the lanes to which the route being traveled leads.

A computer program for travel control stored in a non-transitory computer-readable medium according to the present disclosure causes one or more processors to execute a process including generating routes respectively leading from a current lane being traveled by a vehicle to lanes except the current lane. The lanes are demarcated by lane lines and located forward in a travel direction beyond a lack-of-lane zone having no lane line. The process further includes identifying one of the routes corresponding to a path along which the vehicle is traveling the lack-of-lane zone as a route being traveled. The path is calculated with data outputted from a sensor mounted on the vehicle. The process further includes controlling travel of the vehicle to keep one of the lanes to which the route being traveled leads.

The travel controller according to the present disclosure can control travel of a vehicle so that the vehicle will appropriately change travel lanes even at a location having no lane line.

DESCRIPTION OF EMBODIMENTS

A travel controller that enables a vehicle to appropriately change travel lanes even at a location having no lane line will now be described with reference to the attached drawings. The travel controller generates routes respectively leading from a current lane being traveled by a vehicle to lanes except the current lane. The lanes are demarcated by lane lines and located forward in a travel direction beyond a lack-of-lane zone having no lane line. The travel controller further identifies one of the routes corresponding to a path along which the vehicle is traveling the lack-of-lane zone as a route being traveled. The path is calculated with data outputted from a sensor mounted on the vehicle. Then the travel controller controls travel of the vehicle to keep one of the lanes to which the route being traveled leads.

Figure 1:
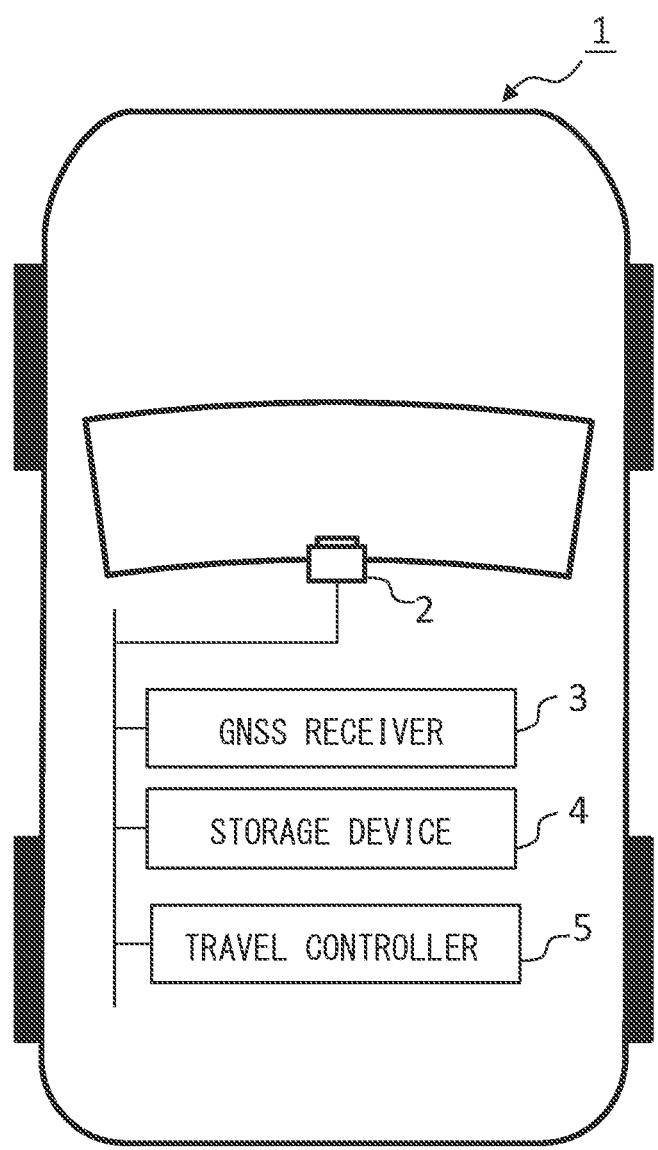
FIG. 1 schematically illustrates the configuration of a vehicle equipped with a travel controller.

FIG. 1 schematically illustrates the configuration of a vehicle equipped with the travel controller.

The vehicle 1 includes a camera 2, a global navigation satellite system (GNSS) receiver 3, a storage device 4, and a travel controller 5. The camera 2, the GNSS receiver 3, and the storage device 4 are connected to the travel controller 5 via an in-vehicle network conforming to a standard, such as a controller area network, so that they can communicate with each other.

The camera 2 is an example of a sensor for detecting the surroundings of the vehicle. The camera 2 includes a two-dimensional detector constructed from an array of optoelectronic transducers, such as CCD or C-MOS, having sensitivity to visible light and a focusing optical system that forms an image of a target region on the two-dimensional detector. The camera 2 is disposed, for example, in a front and upper area in the interior of the vehicle and oriented forward, takes a picture of the surroundings of the vehicle 1 through a windshield every predetermined capturing period (e.g., 1/30 to 1/10 seconds), and outputs images corresponding to the surroundings. Each image is an example of the data outputted from a sensor.

The GNSS receiver 3 receives GNSS signals from GNSS satellites at predetermined intervals, and determines the position of the vehicle 1, based on the received GNSS signals. The GNSS receiver 3 outputs a positioning signal indicating the result of determination of the position of the vehicle 1 based on the GNSS signals to the travel controller 5 via the in-vehicle network at predetermined intervals.

The storage device 4 is an example of a storage unit, and includes, for example, a hard disk drive or a nonvolatile semiconductor memory. The storage device 4 contains a high-precision map, which includes, for example, information indicating lack-of-lane zones and lane lines on roads included in a predetermined region represented in this map.

The travel controller 5 is an electronic control unit (ECU) including a communication interface, a memory, and one or more processors. The travel controller 5 detects lane lines and lanes ahead of the vehicle 1, based on an image received from the camera 2 via the communication interface, and controls travel of the vehicle 1 to travel along a predetermined lane.

Figure 2:
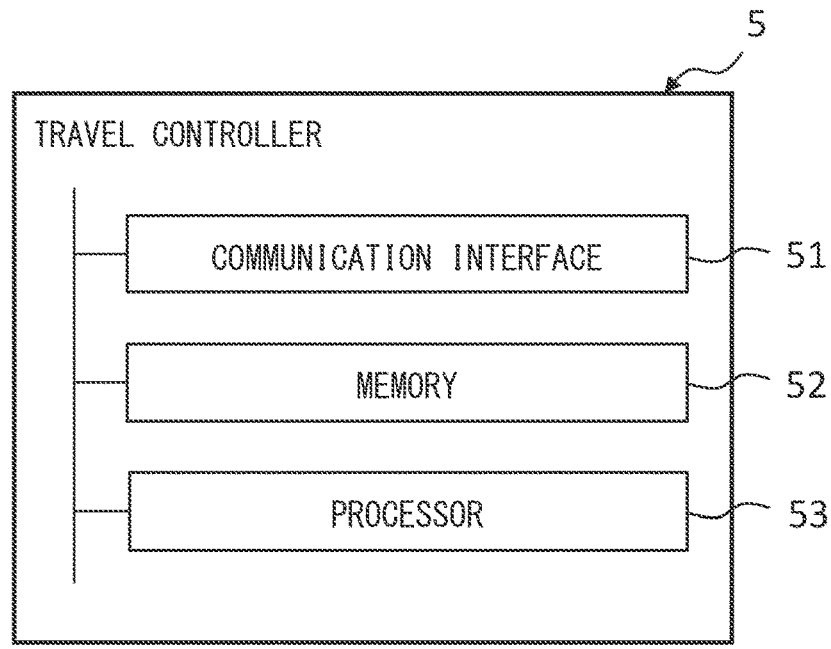
FIG. 2 schematically illustrates the hardware of the travel controller.

FIG. 2 schematically illustrates the hardware of the travel controller 5. The travel controller 5 includes a communication interface 51, a memory 52, and a processor 53.

The communication interface 51 is an example of a communication unit, and includes a communication interface circuit for connecting the travel controller 5 to the in-vehicle network. The communication interface 51 provides received data for the processor 53, and outputs data provided from the processor 53 to an external device.

The memory 52 is an example of a storage unit, and includes volatile and nonvolatile semiconductor memories. The memory 52 contains various types of data used for processing by the processor 53, such as a distance threshold that defines the distance from a current lane to the vehicle 1 to start lane keeping control. The memory 52 also contains various application programs, such as a travel control program for executing a travel control process.

The processor 53 is an example of a control unit, and includes one or more processors and a peripheral circuit thereof. The processor 53 may further include another operating circuit, such as a logic-arithmetic unit, an arithmetic unit, or a graphics processing unit.

Figure 3:
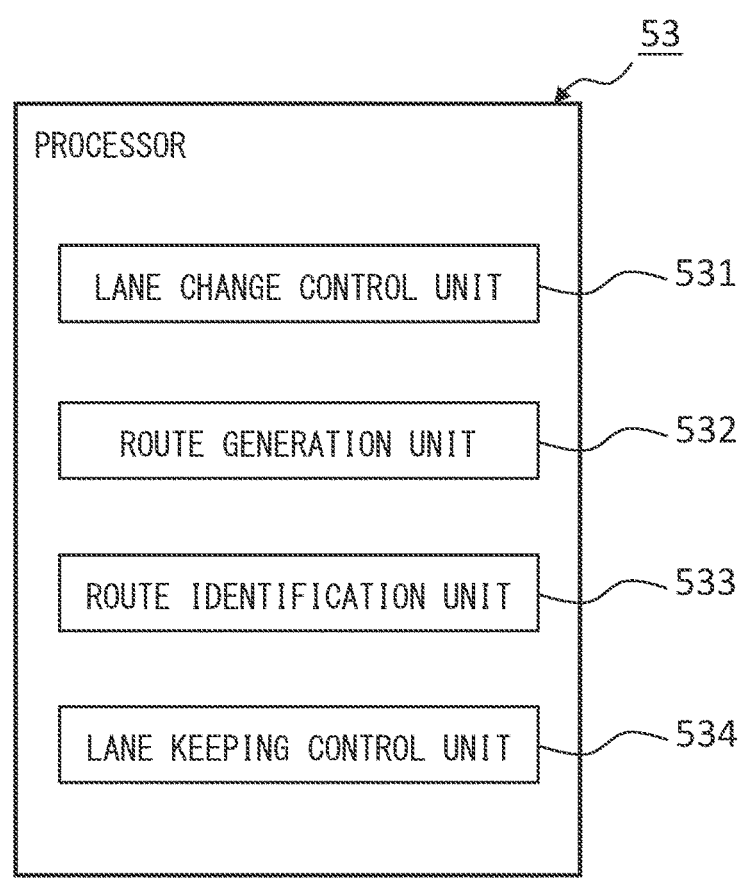
FIG. 3 is a functional block diagram of a processor included in the travel controller.

FIG. 3 is a functional block diagram of the processor 53 included in the travel controller 5.

As its functional blocks, the processor 53 of the travel controller 5 includes a lane change control unit 531, a route generation unit 532, a route identification unit 533, and a lane keeping control unit 534. These units included in the processor 53 are functional modules implemented by a program executed on the processor 53, or may be implemented in the travel controller 5 as separate integrated circuits, microprocessors, or firmware.

The lane change control unit 531 controls travel of the vehicle 1 so that it will move from a current lane being traveled by the vehicle 1 to a target lane, which is one of lanes except the current lane that are demarcated by lane lines and located forward in the travel direction beyond a lack-of-lane zone having no lane line.

The lane change control unit 531 inputs an image received from the camera 2 via the communication interface into a classifier to identify a lack-of-lane zone and lane lines ahead of the vehicle 1. The classifier has been trained to detect lane lines, which are demarcation lines drawn on a road for dividing lanes.

The classifier may be, for example, a convolutional neural network (CNN) including convolution layers connected in series from the input toward the output. A CNN that has been trained using inputted images including lane lines as training data operates as a classifier to detect lane lines from an image.

The lane change control unit 531 may obtain from the storage device 4 information on a lack-of-lane zone and lane lines in an area in the high-precision map around the current position of the vehicle 1 indicated by a positioning signal received from the GNSS receiver 3 via the communication interface.

The lane change control unit 531 may obtain from the storage device 4 information on a lack-of-lane zone and lane lines in an area in the high-precision map around the current position of the vehicle 1 determined from the history of travel of the vehicle obtained with a wheel speed sensor (not shown) and a gyro sensor (not shown).

The lane change control unit 531 outputs a control signal to a travel mechanism (not shown) of the vehicle 1 via the communication interface 51 to move from the current lane to the target lane. The travel mechanism includes, for example, an engine or a motor for powering the vehicle 1, brakes for decelerating the vehicle 1, and a steering mechanism for steering the vehicle 1.

The target lane is selected from among multiple lanes, based on a travel plan from the current position to a destination. For example, when a turn into a diverging road ahead of the current position is planned, a lane to enter the diverging road is selected as the target lane.

The route generation unit 532 generates routes respectively leading from the current lane to lanes that include the target lane and that are located forward in the travel direction beyond a lack-of-lane zone. The route generation unit 532 connects a lane change start position in the current lane at which a lane change will start and a lane change end position in each lane at which the lane change will end ahead of the lane change start position, thereby generating each route. Between the lane change start position and the lane change end position is located a lack-of-lane zone.

The route identification unit 533 identifies one of the routes corresponding to a path along which the vehicle 1 is traveling the lack-of-lane zone as a route being traveled, using data outputted from the camera 2 mounted on the vehicle 1. The route identification unit 533 inputs an image received from the camera 2 via the communication interface into a classifier to identify lane lines around the vehicle 1. The classifier has been trained to detect lane lines, which are demarcation lines drawn on a road for dividing lanes. The route identification unit 533 detects the path indicating the direction in which the vehicle 1 is traveling in the lack-of-lane zone, based on the positions of the identified lane lines.

Figure 4:
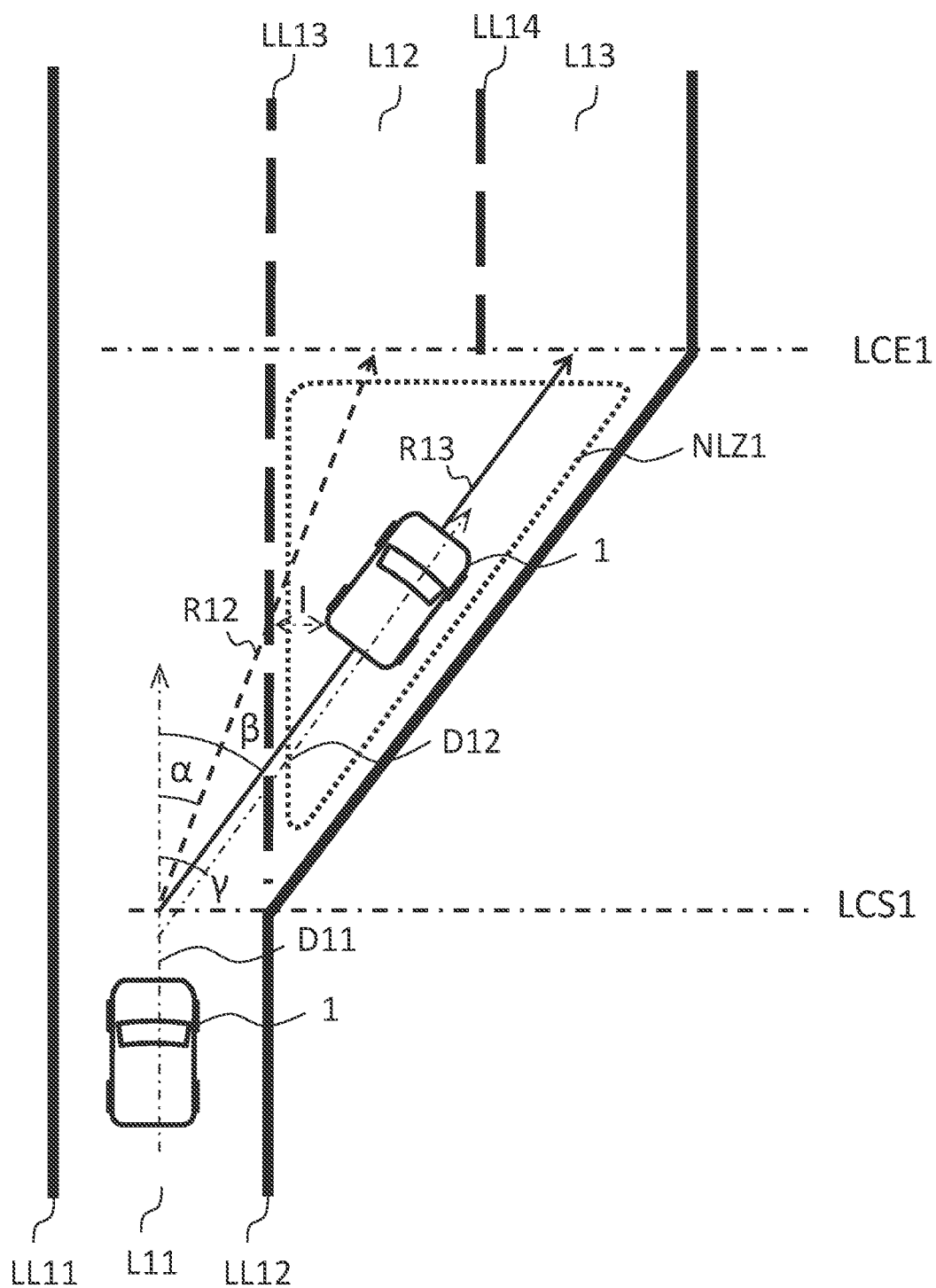
FIG. 4 is a diagram for explaining a first example of route identification.

FIG. 4 is a diagram for explaining a first example of route identification.

Before starting a lane change, the vehicle 1 travels a current lane L11 demarcated by lane lines LL11 and LL12. A lane L12 demarcated by lane lines LL13 and LL14 as well as a lane L13 demarcated by the lane lines LL14 and LL12 are located forward in the travel direction beyond a lack-of-lane zone NLZ1 having no lane line. Ahead of the vehicle 1, the current lane L11 is demarcated by the lane lines LL11 and LL13.

In the example of FIG. 4, the lane L13 is selected as a target lane. The lane change control unit 531 controls travel of the vehicle 1 heading for a lane change end position LCE1 from a lane change start position LCS1 so that the vehicle 1 will move from the current lane L11 to the target lane L13.

The route generation unit 532 connects the lane change start position LCS1 in the current lane L11 and lane change end positions LCE1 in the lanes L12 and L13 other than the current lane L11, thereby generating routes R12 and R13. The route generation unit 532 sets each lane change end position LCE1 at a position where the lane line LL14 exists, which does not exist at the lane change start position LCS1.

The route R12 extends in a direction forming an angle α with the travel direction D11 of the vehicle 1 at the lane change start position LCS1. The route R13 extends in a direction forming an angle β with the travel direction D11 of the vehicle 1 at the lane change start position LCS1.

After passing the lane change start position LCS1, the vehicle 1 travels at the position a distance I away from the current lane L11 under travel control by the lane change control unit 531 to head for the lane L13 from the current lane L11. The travel direction of the vehicle 1 at this time is D12, which forms an angle γ with the travel direction D11 of the vehicle 1 at the lane change start position LCS1.

Of the routes R12 and R13, the route identification unit 533 identifies the route corresponding to the travel direction D12 at the current position of the vehicle 1 as the route being traveled, after the distance I from the current lane L11 to the current position of the vehicle 1 in the lack-of-lane zone NLZ1 exceeds a distance threshold stored in the memory 52.

The route identification unit 533 determines the differences between the angles formed by the direction D11 and the directions of the routes R12 and R13 and the angle formed by the direction D11 and the travel direction D12 at the current position of the vehicle 1, and identifies the route R13, whose difference is the smaller, as the route being traveled. The route identification unit 533 may identify the route whose difference is the smallest of the routes whose difference is smaller than an angular difference threshold prestored in the memory 52 as a route being traveled. Instead of the differences between the angles formed by the direction D11 and the directions of the routes R12 and R13 and the angle formed by the direction D11 and the travel direction D12 at the current position of the vehicle 1, the route identification unit 533 may use the ratios of the angles formed by the direction D11 and the directions of the routes R12 and R13 to the angle formed by the direction D11 and the travel direction D12 at the current position of the vehicle 1 to identify the route being traveled.

Figure 5:
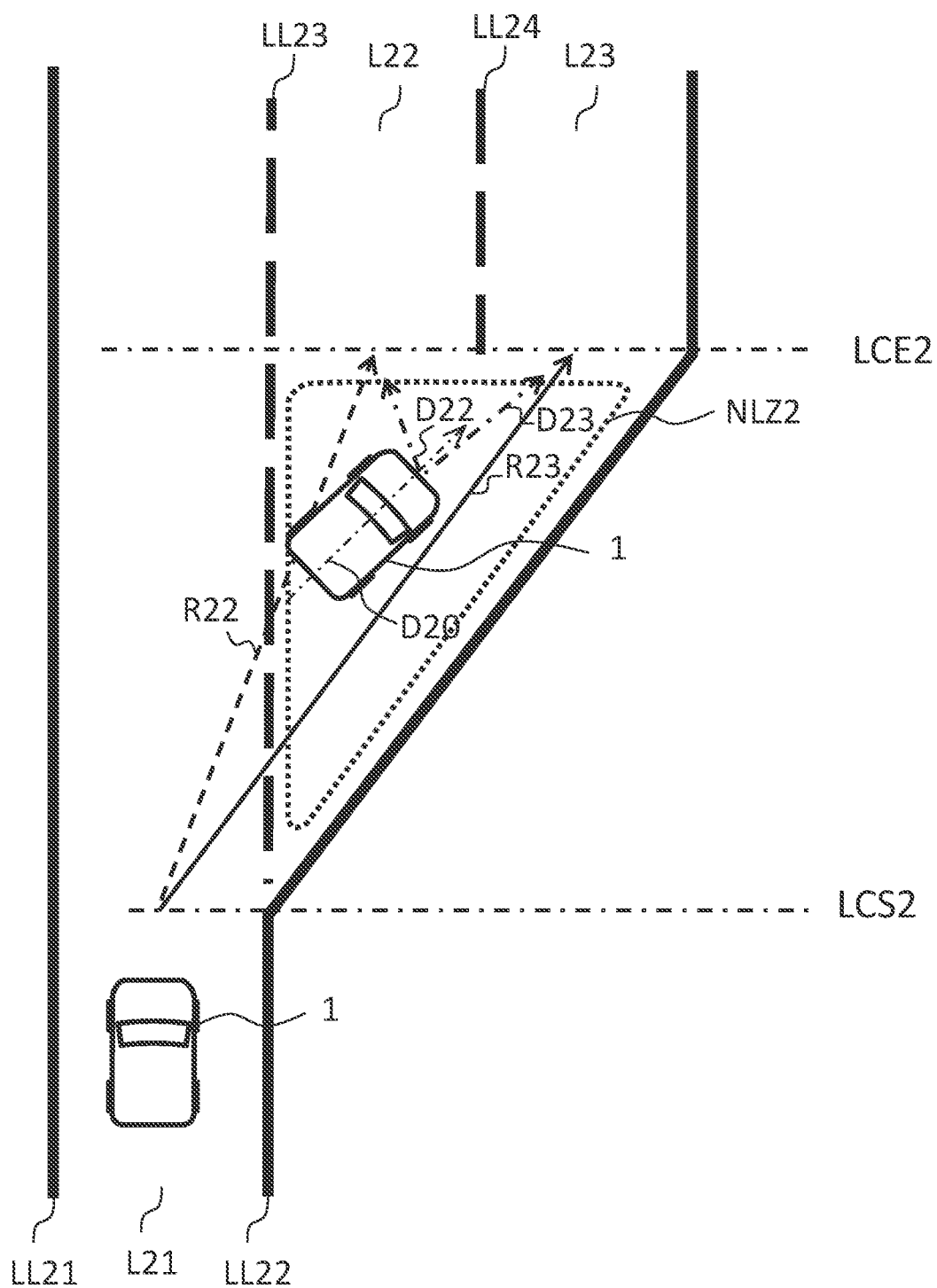
FIG. 5 is a diagram for explaining a second example of route identification.

FIG. 5 is a diagram for explaining a second example of route identification.

Before starting a lane change, the vehicle 1 travels a current lane L21 demarcated by lane lines LL21 and LL22. A lane L22 demarcated by lane lines LL23 and LL24 as well as a lane L23 demarcated by the lane lines LL24 and LL22 are located forward in the travel direction beyond a lack-of-lane zone NLZ2 having no lane line. Ahead of the vehicle 1, the current lane L21 is demarcated by the lane lines LL21 and LL23.

In the example of FIG. 5, the lane L22 is selected as a target lane. The lane change control unit 531 controls travel of the vehicle 1 heading for a lane change end position LCE2 from a lane change start position LCS2 so that the vehicle 1 will move from the current lane L21 to the target lane L22.

The route generation unit 532 connects the lane change start position LCS2 in the current lane L21 and lane change end positions LCE2 in the lanes L22 and L23, thereby generating routes R22 and R23. The route generation unit 532 sets each lane change end position LCE2 at a position where the lane line LL24 exists, which does not exist at the lane change start position LCS2.

After passing the lane change start position LCS2, the vehicle 1 first travels from the current lane L21 toward the lane L22 under travel control by the lane change control unit 531. In the example of FIG. 5, additional steering by the driver of the vehicle 1 after passing the lane change start position LCS2 causes the vehicle 1 to travel in a travel direction D20.

The route identification unit 533 determines whether the routes R22 and R23 are reachable from the current position of the vehicle 1. To reach the routes R22 and R23 from the current position of the vehicle 1, it is necessary to travel in directions D22 and D23 connecting the current position and the end points of the routes R22 and R23, respectively. The route identification unit 533 determines the angles formed by the travel direction D20 of the vehicle 1 and the directions D22 and D23. Of the directions D22 and D23, the route identification unit 533 determines that a direction forming an angle smaller than a maximum steering angle depending on the current speed of the vehicle 1 with the travel direction D20 is reachable from the current position, and identifies the route corresponding to this direction as a route reachable from the current position. When only one of the routes is reachable from the current position, the route identification unit 533 identifies this route as the route being traveled.

In the example of FIG. 5, the direction D22 is not reachable from the current position whereas the direction D23 is reachable from the current position. Thus the route identification unit 533 identifies the route R23 corresponding to the direction D23 as the route being traveled.

The lane keeping control unit 534 controls travel of the vehicle 1 to keep a lane to which the route being traveled leads of the lanes demarcated by lane lines.

The lane keeping control unit 534 identifies lane lines demarcating the lane to which the route being traveled leads, and outputs a control signal to the travel mechanism (not shown) of the vehicle 1 via the communication interface 51 to keep the lane demarcated by these lane lines.

Since the identification of the lane lines and the output of a control signal to the travel mechanism are similar to those executed by the lane change control unit 531, detailed explanation thereof is omitted.

Figure 6:
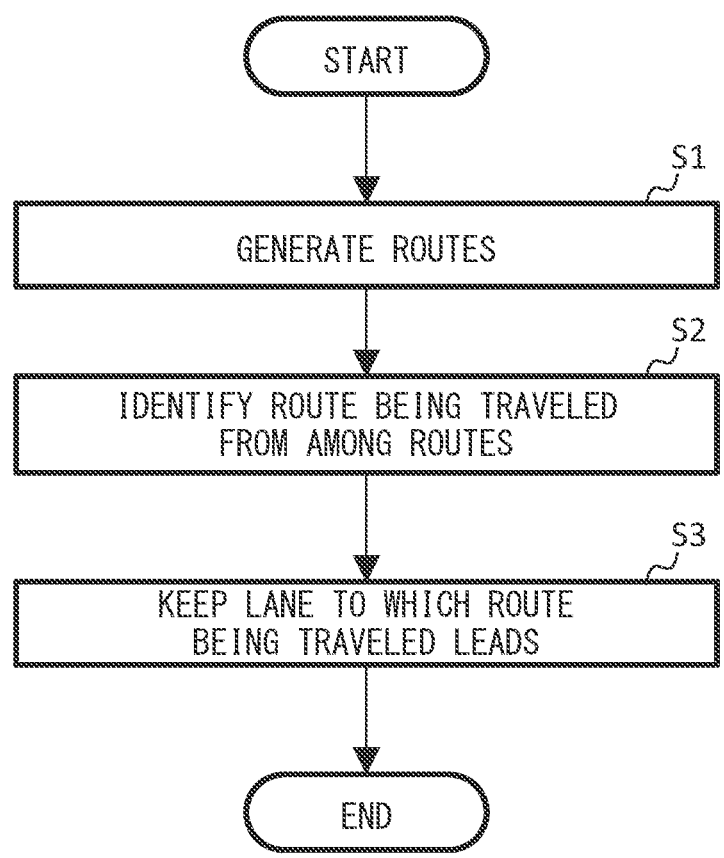
FIG. 6 is a flowchart of a travel control process.

FIG. 6 is a flowchart of a travel control process. After the vehicle 1 starts lane change control and the distance from a current lane to the current position of the vehicle 1 exceeds the distance threshold stored in the memory 52, the travel controller 5 executes the process of FIG. 6.

First, the route generation unit 532 generates routes respectively leading from a current lane being traveled by the vehicle 1, which is one of lanes demarcated by lane lines, to the lanes except the current lane (step S1).

Next, from among the routes, the route identification unit 533 identifies the route being traveled that matches a path along which the vehicle 1 is traveling (step S2).

Then the lane keeping control unit 534 controls travel of the vehicle 1 to keep one of the lanes to which the route being traveled leads (step S3).

By executing the travel control process in this way, the travel controller 5 can control travel of the vehicle 1 to appropriately change travel lanes even at a location having no lane line.

Note that those skilled in the art can apply various changes, substitutions, and modifications without departing from the spirit and scope of the present disclosure.

What is claimed is:

1. A travel controller comprising one or more processors programmed to:
   generate, before a vehicle reaches a lack-of-lane zone having no lane line, a plurality of routes respectively leading from (i) a current lane being traveled by the vehicle at a lane change start position before the lack-of-lane zone to (ii) lanes except the current lane, the lanes being demarcated by lane lines and located forward in a travel direction beyond the lack-of-lane zone;
   select a first target lane from the lanes except the current lane;
   control the vehicle so that, after passing the lane change start position, the vehicle travels along one of the generated routes that leads to the first target lane;
   after additional steering by a driver of the vehicle while the vehicle travels in the lack-of-lane zone along the one generated route, determine which of the plurality of generated routes are reachable from a current position of the vehicle in the lack-of-lane zone;
   when the one generated route is determined to be not reachable by the vehicle from the current position but another of the generated routes is determined to be reachable from the current position, identify the other generated route as a route being traveled; and
   control travel of the vehicle to keep a second target lane of the lanes except the current lane to which the route being traveled leads.

2. The travel controller according to claim 1, wherein the other generated route identified by the one or more processors as the route being traveled has a direction that corresponds to a travel direction of the vehicle at the current position in the lack-of-lane zone.

3. The travel controller according to claim 1, wherein the other generated route identified by the one or more processors as the route being traveled is the only one of the plurality of generated routes reachable by the vehicle from the current position in the lack-of-lane zone.

4. The travel controller according to claim 1, wherein the other generated route is identified by the one or more processors as the route being traveled after a distance from the current lane to the current position of the vehicle in the lack-of-lane zone exceeds a distance threshold.

5. The travel controller according to claim 1, wherein the one or more processors are programmed to determine which of the plurality of generated routes are reachable from the current position of the vehicle in the lack-of-lane zone by comparing to a maximum steering angle of the vehicle angles formed by (i) a travel direction of the vehicle and (ii) directions connecting the current position of the vehicle to end points of the generated plurality of routes.

6. A method for travel control, comprising:
   generating, before a vehicle reaches a lack-of-lane zone having no lane line, a plurality of routes respectively leading from (i) a current lane being traveled by the vehicle at a lane change start position before the lack-of-lane zone to (ii) lanes except the current lane, the lanes being demarcated by lane lines and located forward in a travel direction beyond the lack-of-lane zone;
   selecting a first target lane from the lanes except the current lane;
   controlling the vehicle so that, after passing the lane change start position, the vehicle travels along one of the generated routes that leads to the first target lane;
   after additional steering by a driver of the vehicle while the vehicle travels in the lack-of-lane zone along the one generated route, determining which of the plurality of generated routes are reachable from a current position of the vehicle in the lack-of-lane zone;
   when the one generated route is determined to be not reachable by the vehicle from the current position but another of the generated routes is determined to be reachable from the current position, identifying the other generated route as a route being traveled; and
   controlling travel of the vehicle to keep a second target lane of the lanes except the current lane to which the route being traveled leads.

7. A non-transitory computer-readable medium having a computer program for travel control stored therein, the computer program causing one or more processors to execute a process comprising:
   generating, before a vehicle reaches a lack-of-lane zone having no lane line, a plurality of routes respectively leading from (i) a current lane being traveled by the vehicle at a lane change start position before the lack-of-lane zone to (ii) lanes except the current lane, the lanes being demarcated by lane lines and located forward in a travel direction beyond the lack-of-lane zone;
   selecting a first target lane from the lanes except the current lane;
   controlling the vehicle so that, after passing the lane change start position, the vehicle travels along one of the generated routes that leads to the first target lane;
   after additional steering by a driver of the vehicle while the vehicle travels in the lack-of-lane zone along the one generated route, determining which of the plurality of generated routes are reachable from a current position of the vehicle in the lack-of-lane zone;
   when the one generated route is determined to be not reachable by the vehicle from the current position but another of the generated routes is determined to be reachable from the current position, identifying the other generated route as a route being traveled; and
controlling travel of the vehicle to keep a second target lane of the lanes except the current lane to which the route being traveled leads.

\* \* \* \* \*